United States Patent [19]
Jackson et al.

[11] Patent Number: 5,137,184
[45] Date of Patent: Aug. 11, 1992

[54] CAULKING GUN AND CARTRIDGE

[75] Inventors: Eric W. Jackson, Whitby; William A. Campbell, Glencoe, both of Canada

[73] Assignee: Tremco Incorporated, Cleveland, Ohio

[21] Appl. No.: 568,812

[22] Filed: Aug. 17, 1990

[51] Int. Cl.$^5$ ............................................. B65D 25/40
[52] U.S. Cl. ................................ 222/327; 222/569; 222/570
[58] Field of Search ............... 222/325, 326, 327, 336, 222/340, 390, 391, 568, 569, 570

[56] References Cited

U.S. PATENT DOCUMENTS

| | | | |
|---|---|---|---|
| 1,259,146 | 3/1918 | Shields | 222/326 |
| 1,976,253 | 10/1934 | Clark | 222/391 |
| 2,102,939 | 12/1937 | Bishop | 222/391 X |
| 2,115,591 | 4/1938 | Sherbondy | 222/391 |
| 2,512,178 | 6/1950 | Sherbondy | 222/327 |
| 2,617,560 | 11/1952 | Pietrzak | 222/391 |
| 2,821,332 | 1/1958 | Sherbondy | 222/325 |
| 3,487,982 | 1/1970 | Rowe | 222/569 |
| 3,640,431 | 2/1972 | Plumer | 222/326 |
| 3,997,085 | 12/1976 | Lindquist | 222/391 X |
| 4,323,176 | 4/1982 | Sartain | 222/326 |

FOREIGN PATENT DOCUMENTS

| | | | |
|---|---|---|---|
| 1238023 | 6/1988 | Canada | 222/570 |
| 825409 | 12/1959 | United Kingdom | 222/325 |
| 2092236 | 7/1982 | United Kingdom | 222/325 |

Primary Examiner—Kevin P. Shaver
Assistant Examiner—Philippe Derakshani
Attorney, Agent, or Firm—Joseph Januszkiewicz

[57] ABSTRACT

A caulking gun with the open supporting framework that has a forwardly disposed ring member and a rearwardly disposed trigger actuating mechanism that is cooperative with a rod member with teeth thereon to advance the piston on the one end of the rod member which in turn operates on a moveable member in a disposable cartridge that is received by the supporting framework. A nozzle is removably connectable with the cartridge and is also removably connectable with the ring member of the gun to provide selective detachment.

6 Claims, 6 Drawing Sheets

CAULKING GUN AND CARTRIDGE

BACKGROUND OF THE INVENTION

This invention relates to a portable caulking guns and more particularly to a new and improved caulking gun that employs a disposable cartridge, a new and improved disposable caulking cartridge; and a new combination of gun and cartridge.

One of the problems with the dispensing of caulking compounds is that they are thixotropic in nature and are generally extruded from a caulking cartridge with the aid of a caulking gun through the nozzle of the cartridge under substantial pressure. Caulking compounds are often spoken of as viscous in nature, however, because of additives, the additional property of resistance to flow must be considered. Thixotropic is the resistance to flow and sag. Additives are mixed into some caulking compound to provide this property of resistance to prevent their flow and sag after application, however, such property also contributes to a problem of interfering with the free flow of the caulking material through the caulking cartridge and nozzle. In the case of caulking compounds for use in the construction industry, the additives added are those such as fumed silica, Thixatrol ®, asbestos and Thixatrol-R ®. These additives make the caulking compound desirable for use in caulking overhead seams or vertical spaces between joining elements since there is no propensity for the caulking seam to flow or sag from the site of its application. Due to the nature of the thixotropic type caulking material which is plastic and somewhat elastic, there is considerable compressing of the material under the actuating pressure, and when the operator interrupts the operation of dispensing a bead of the caulking compound, the caulking material continues to flow and ooze out of the caulking gun because of the compression, which action is wasteful of the material, untidy and very time consuming as where such sticky caulking material must be cleaned up.

Where only a single tube is used, there may be no great problem, but on construction sites where extensive caulking must be done, the problem of using thixotropic compounds where continued flow occurs presents a serious problem.

A further consideration that must be recognized is the type of caulking gun used or is being referred to. The first type to be considered is a B-D gun or a bulk dispensing gun which is a complete unit unto itself, containing a closed cylindrical chamber or shell with nozzle and actuating means. The second type of caulking gun used is one that has an open framed supporting structure with an actuating mechanism plus a separate disposable cartridge that has its own nozzle. The latter type of open framed cartridge gun (C-gun) is essentially a two separate unit type of caulking gun, with the cartridge and its nozzle being the second separate and disposable element of the gun.

In the case of the C-gun or cartridge gun, the opening of the nozzle in the cartridge is not consistent in its diameter opening even though a cut on the nozzle is made at the same reference point (i.e., as one inch from the tip) because the nature of the materials used allows an inconsistent growth in size of the product nozzle after release from the mold. A further problem of the C-gun is the clean up and health hazard created by the numerous continuing flow after release of the actuating mechanism. Hazardous solvents must be used for clean up of the work affected area and the operator's skin. In both the C-gun and the B-D gun, changing colors is difficult and particularly time consuming in the case of the bulk disposing (B-D) gun. Some type of tool must be used in the case of the cartridge type gun to puncture the cartridge seal to initiate the flow of the caulking material. Applicant's invention requires no tool to puncture a seal to effect flow, thereby eliminating the need to carry such tool which in all instances, has the caulking compound on it for exposure to contact by the operator. In applicant's invention, no human contact with the caulking material or the adhesive material is required. The adhesive material referred to is that used on the foil to bond it to the metal end cap of the cartridge prior to the affixing of the nozzle to the cartridge. In the case of the bulk dispensing gun, the loading generally relies on the use of vacuum to load the cylindrical shell whereas the invention provides for a faster means to load and use, which is particularly advantageously in view of the thixotropic and viscous properties of the caulking compound. Where the B-D gun uses a transfer device, such as a pressure driven ram to the gunning head, additional heavy duty equipment must be employed, taking up space, which is in sharp contrast to the invention that employs disposable caulking compound containers.

The present invention provides a new and improved dispensing gun, cartridge and system, which more accurately controls the dispensing of the caulking material, allowing for flow interruption without the need for cleanup. In addition, the caulking disposable cartridge of the present invention is useable with the cartridge, caulking guns having a new and improved construction that facilitates the even flow of the caulking material and prevents the build up of pressure within the cartridge itself.

SUMMARY OF THE INVENTION

The present invention is directed to a caulking gun with an open framework that has a forwardly disposed rim member and a rearwardly disposed trigger actuating mechanism operative on a piston. A nozzle is removably mounted on the rim member of the gun and is also operatively connectable to a disposable cartridge which is removably connected to the gun and cooperative with the piston to dispense mastic compound through the nozzle. The nozzle has a cone-shaped configuration whose base is of the same dimension as the cartridge.

DESCRIPTION OF THE PREFERRED EMBODIMENTS

Figure 1:
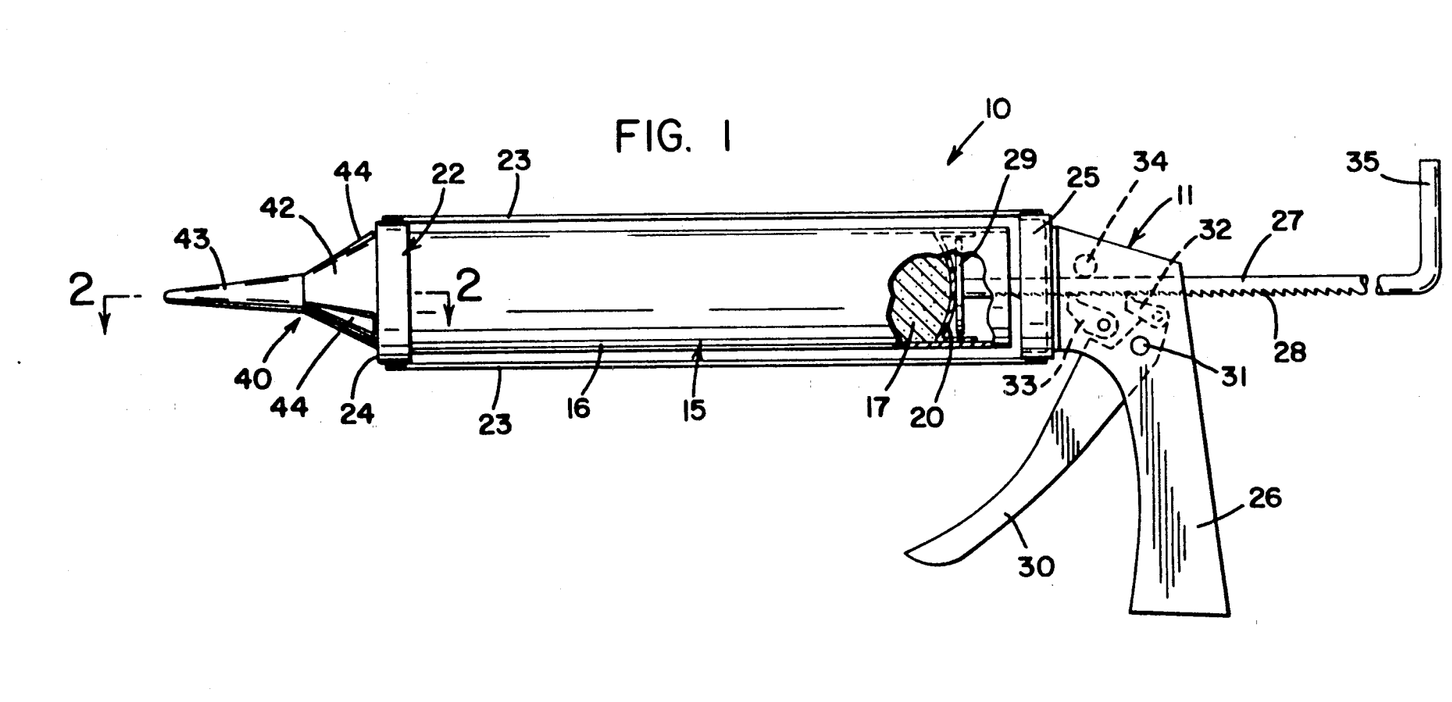
FIG. 1 is a side elevational view of a caulking gun with a portion of the cartridge broken away to show the caulking material and cup-shaped piston in the cartridge.

Referring to the drawings, wherein like reference numerals designate like or corresponding parts throughout the several views, there is shown in FIG. 1 a caulking gun 10 comprising a stock 11 and a cartridge holder or open structured supporting framework to be described. The cartridge holder supports a cartridge 15 having a cylindrical body 16 containing a viscous caulking mastic such as a thixotropic caulking material or compound 17. The one end of such cylindrical body 16 has a removable zip top lid 18 (FIG. 4) with a tab 19 suitably attached thereto to facilitate the removal of the lid. The other end of the cylindrical cartridge body 16 contains a freely movable cup-shaped movable member or piston 20, which piston 20 is slidable along the tubular length of such body.

The open structured supporting framework or open framework of the gun 10 comprises a forwardly disposed rim or ring member 22 (or) which can be cup-shaped (ring 22) and (that) has the one end of longitudinally extending rods or metal strips 23—23 secured thereto. The inner periphery of ring 22 presents an annular lip or edge 24 (FIGS. 2, 4 & 6) for a purpose to be described. The other ends of such rods 23—23 are secured to a cup-shaped support or support member 25 which in turn is suitably secured to the stock 11 with a handle 26 depending therefrom. The cup-shaped support 25 has a closed end wall with a central bore or slot therethrough which receives for unobstructed passage therethrough a longitudinally extending rod or stem 27. The one side of the operating rod 27 has a set of ratchet teeth 28 thereon to facilitate the controlled advancement of such rod and a piston 29 that is rotatably connected to one end of such rod 27.

The operating mechanism for the caulking gun 10 comprises a trigger-like lever 30 pivoted as at 31 on the handle 26 and has a spring-pressed pawl 32 at its upper end to engage the teeth 28 for moving the piston 29 on the counter-clockwise movement of the lever 30, with a spring biased pawl 33 also pivoted to handle 26 to retain the forward movement of the rod 27 and piston 29. A roller 34 is mounted on the handle 26 above the operating rod 27 to maintain the rod 26 in contact with the pawls 32 and 33. The trigger like lever 30 has a spring suitably attached to it to bias it away from handle 26, to hold it in its position shown in FIG. 1 for operation.

As the piston 29 and its operating rod 27 are moved in its stepped operating condition by the pawl 32, such rod 27 may be retracted after the caulking cartridge 15 has been emptied, by providing an operating handle 35 on the free end of the operating rod 26. Such handle 35 facilitates the rotation of the operating rod 27 to disengage the pawls 32 and 33 from ratchet teeth 28 so that the operating rod 27 and piston 29 may be moved linearly away from and out of the caulking cartridge 15 so that such cartridge 15 can be removed from the caulking gun 10.

Figures 2, 3:
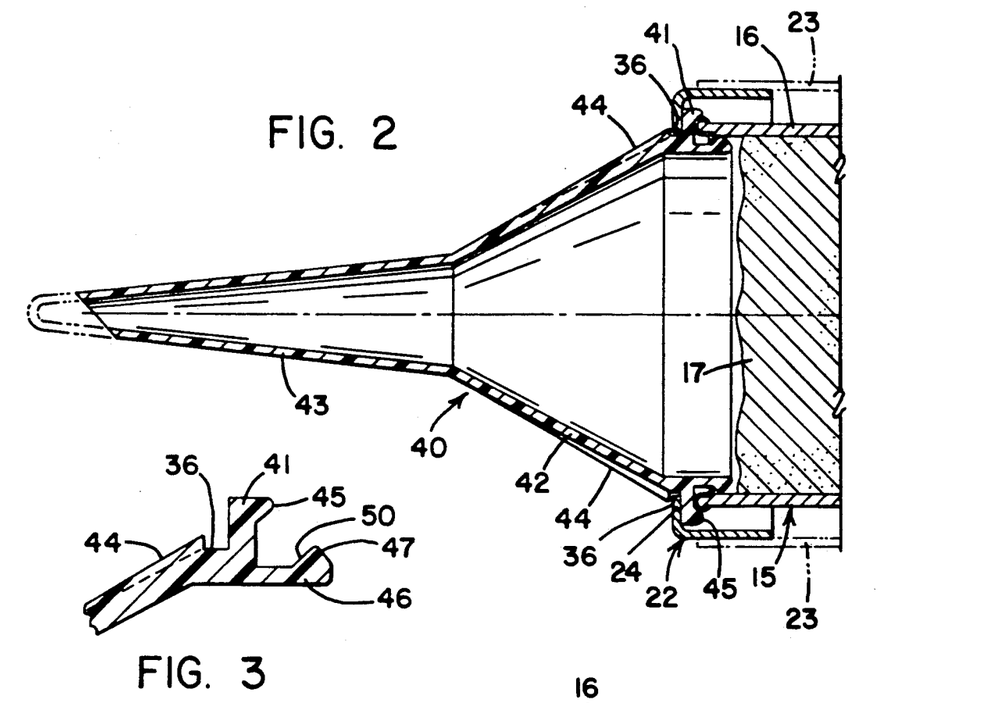
FIG. 2 is an enlarged view taken on line 2—2 of FIG. 1 shown in cross section of the forward portion of the caulking gun, cartridge and nozzle with the forward portion of the nozzle and caulking cartridge locked in the gun.
FIG. 3 is a further enlarged fragmentary view of a portion of nozzle shown in FIG. 2 in cross section.

A replaceable nozzle 40 with an annular ring or base 41 (FIG. 2) is snapped into the forwardly disposed cup-shaped ring or rim 22 in gun 10. The nozzle 40 has a double cone-shaped dispensing end portion with a rearwardly disposed tapered cone portion 42 and a forwardly disposed tapered cone portion 43 that terminates into an apex or tip portion. Tapered cone portion 42 is adjacent to the annular ring 41 and has a steeper taper than the forwardly disposed cone portion 43. Tapered cone portion 42 has a plurality of circumferentially spaced longitudinally extending camming strips 44 that lie along line that are contained by planes passing through the axis of the cone where such planes intersect the surfaces of the cone. The camming strips adjacent to the juncture with the forwardly disposed cone portion 43 are of the same thickness as the adjacent cone portion 42 but increase in height or thickness as they extend towards the edge 24 to define a plurality of circumferentially spaced grooves or recesses 36 in cooperation with the annular ring 41. As seen in FIG. 2, the annular edge 24 of the ring 22 is seated in the respective recesses or grooves 36. Without the cartridge 15 in the caulking gun 10, the nozzle 40 can be introduced into the gun 10 by moving the nozzle 40 towards the ring 22 from the right as viewed in FIG. 1. Further leftward movement of the nozzle 40 will have the camming strip 44 engages the inner periphery of the annular edge 24 of ring 22 until the annular edge 24 moves over the cams 44 and drops into the grooves 36 to lock the nozzle 40 onto the ring 22 of gun 10. Ring 41 on nozzle 40 has a rearwardly disposed annular tapered portion 45 which cooperates with an extension 46 which has an annular flanged portion 47 to define a circumferentially extending groove 50 that cooperates with the forward most portion of the cartridge 15 to lock such nozzle 40 onto cartridge 15. Such groove 50 in effect sealingly engages the one end of the cylindrical body 16 after the zip top lid !8 has been removed from the cartridge body 16.

Figures 5, 6, 7:
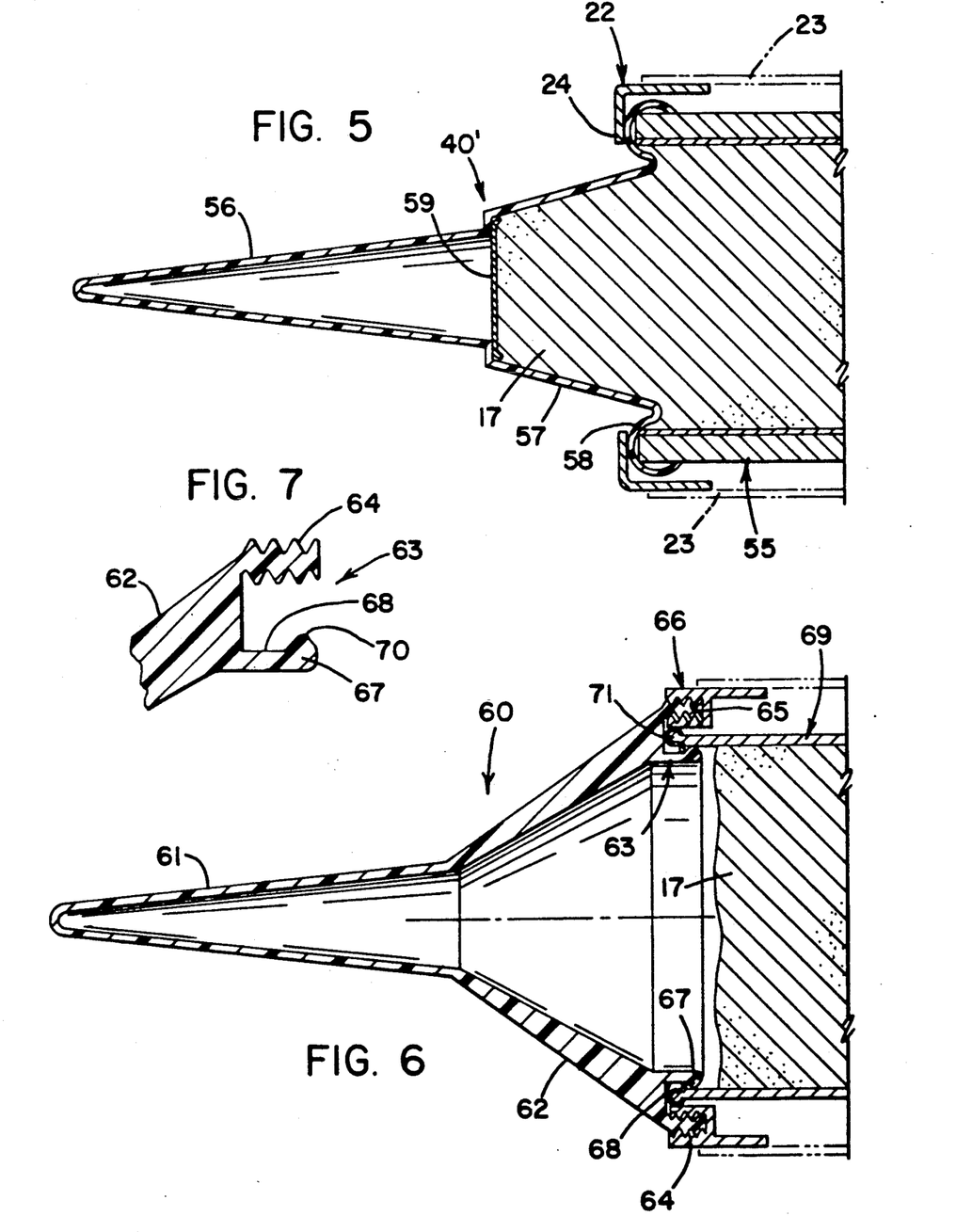
FIG. 5 is a side elevational view in cross section of a modified form of the forward portion of a caulking cartridge.
FIG. 6 is a side elevational view in cross section of a further modified form of the forward portion of a caulking cartridge.
FIG. 7 is an enlarged fragmentary view of a portion of a nozzle shown in FIG. 6 in cross section.

A modification of the nozzle is shown in FIG. 5, wherein the nozzle 40' is affixed to the end of the caulking cartridge 55, having a forwardly disposed tapered end snout 56 and a rearwardly disposed tapered cone 57 whose end portion 58 is crimped over the end of such cartridge 55. A foil 59 is positioned between the snout 56 and the tapered cone 57. The taper on the end snout 56 and cone 57 are substantially the same presenting a one-piece continuous nozzle whose base is substantially the same diameter as that of the cartridge 55 to insure a smooth flow of mastic upon pressurization of the end portion of the cartridge, such as the equivalent of the cup-shaped piston 20 in FIG. 1. The cartridge 55 and nozzle 40' is a complete unit in itself and presents a nozzle that is not reusable as in the first described embodiment.

As an example of the dimensions of such a cartridge, the outside diameter of cartridge 55 is between 2 and 3 inches with an overall length of nozzle as measured along the vertex is between 4 to 6 inches. Preferably, the diameter at the juncture between snout 56 and cone 57 is three-fourth of an inch.

A further modification of the invention is shown in FIG. 6 wherein a nozzle 60 has a forwardly disposed tapered end snout 61 and a rearwardly disposed tapered cone portion 62 terminating into an annular ring 63 with screw threads 64 that are adapted to mate with the screw threads 65 on the recessed end portion of an annular ring 66 of the caulking gun. The annular ring 63 has an inner projecting annular abutment 67 that cooperates with the threaded portion 64 to define an annular recess 68 to receive the end portion of a caulking cartridge 69 to seal such cartridge and direct the mastic through the nozzle 60. As seen in FIG. 6, the annular abutment 67 has an annular outwardly projecting lip 70 to facilitate its sealing engagement with the end lip portion 71 of cartridge 69. In this embodiment, the cartridge 69 has a zip top removable end which upon removal presents such end lip portion 71.

Figures 8, 9, 10:
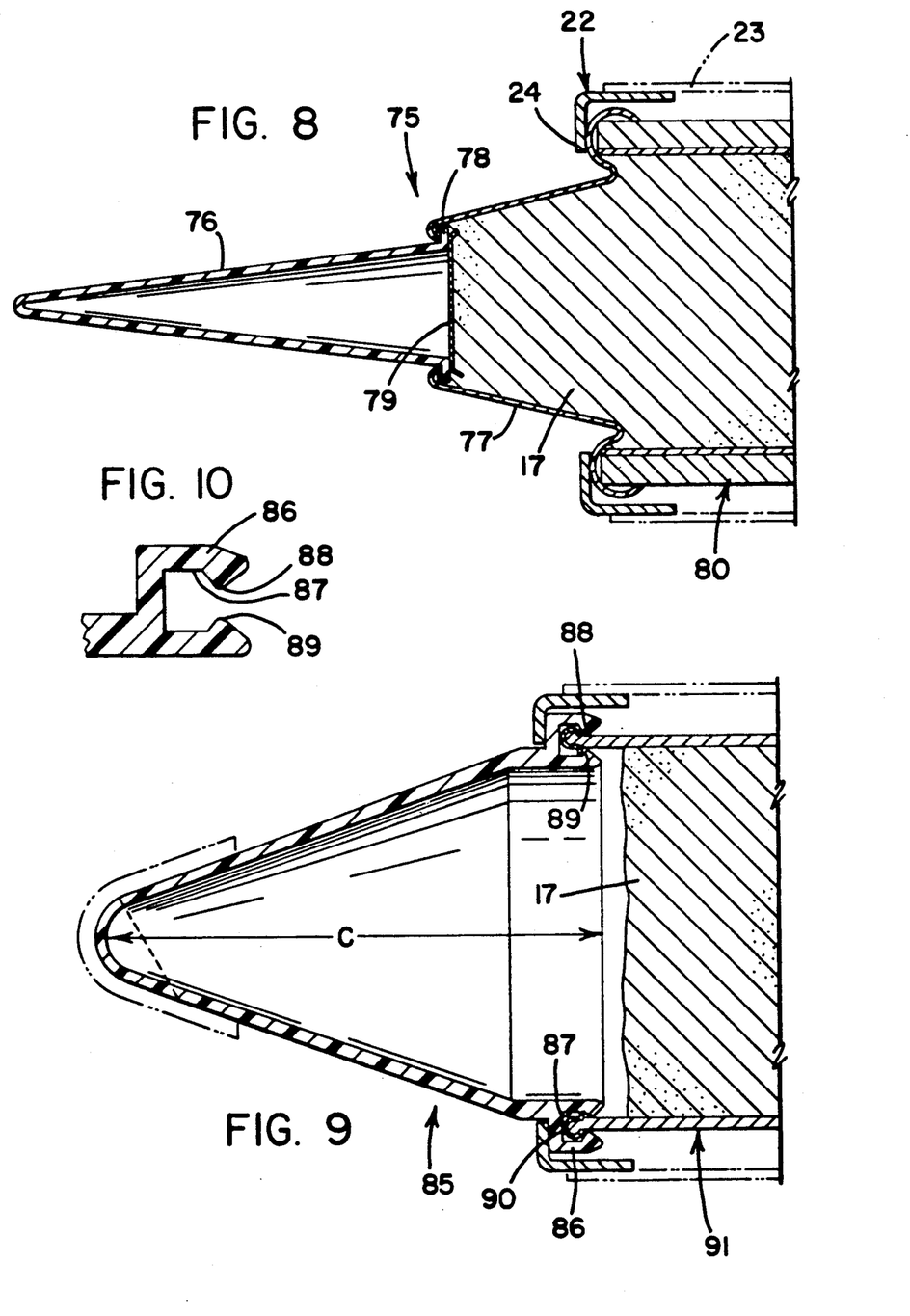
FIG. 8 is a side elevational view in cross section of an additional modification of the forward portion of a caulking cartridge and nozzle.
FIG. 9 is a side elevational view in cross section of an additional modification of the forward portion of a caulking cartridge and nozzle.
FIG. 10 is an enlarged fragmentary view of a portion of a nozzle shown in FIG. 9 in cross section.

A further modification of the invention is shown in FIG. 8 wherein the nozzle 75 is very similar to that disclosed in FIG. 5 except that the nozzle is composed of two separate pieces, namely: a forwardly disposed snout 76 and a rearwardly disposed cone portion 77. The base of the snout 76 has an outwardly projecting flanged portion 78 about which the forwardly disposed portion of cone portion 77 is crimped with a seal 79 positioned at the juncture of snout 76 and cone portion 77. The base of cone portion 77 is crimped about the outer end portion of cartridge 80 to present a one-piece disposable cartridge with its own complete nozzle 75 to facilitate the flow of the mastic material.

Figure 4:
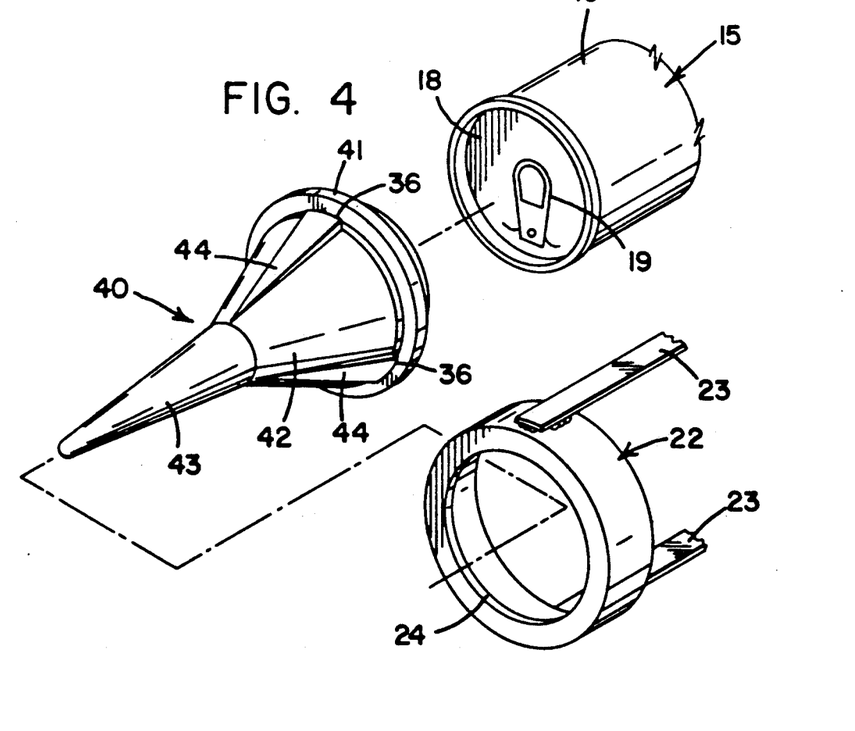
FIG. 4 is a perspective exploded view of the nozzle, forward portion of the cartridge and forward portion of the caulking gun.

Another modification of the invention is shown in FIG. 9 wherein the nozzle 85 has a cone-shaped continuous taper which measures in FIG. 9 approximately 39°. Such nozzle 85 is short in its length along the central axis of the cone. As an example of the dimension, in a cartridge having an outside diameter of 3 inches, the nozzle would have an axial length of 3½ inches as measured along a line C. The nozzle of the instant example provides the unique advantage of accurately controlling the starting and stopping of the flow of the thixotropic mastic compound in response to the immediate pressure of the caulking control gun without the oozing or afterflow and the preventing of the buildup of pressure within the cartridge itself. Such nozzle 85 has an annular ring 86 at the base of the cone with an annular recess 87 extending thereinto along the same general direction as the central axis of the cone- shaped nozzle 85. Such inner wall of recess 87 of ring 86 has a pair of inwardly projecting lips 88 and 89 to sealingly and frictionly engage a rim or end portion 90 of a cartridge 91 as depicted by FIG. 9 to ensure sealing engagement therebetween. In this instance, the nozzle 85 is replaceable relative to the cartridge 91 and can therefore be used with zip top removable cap from the cartridge itself as illustrated in FIG. 4.

Figure 11:
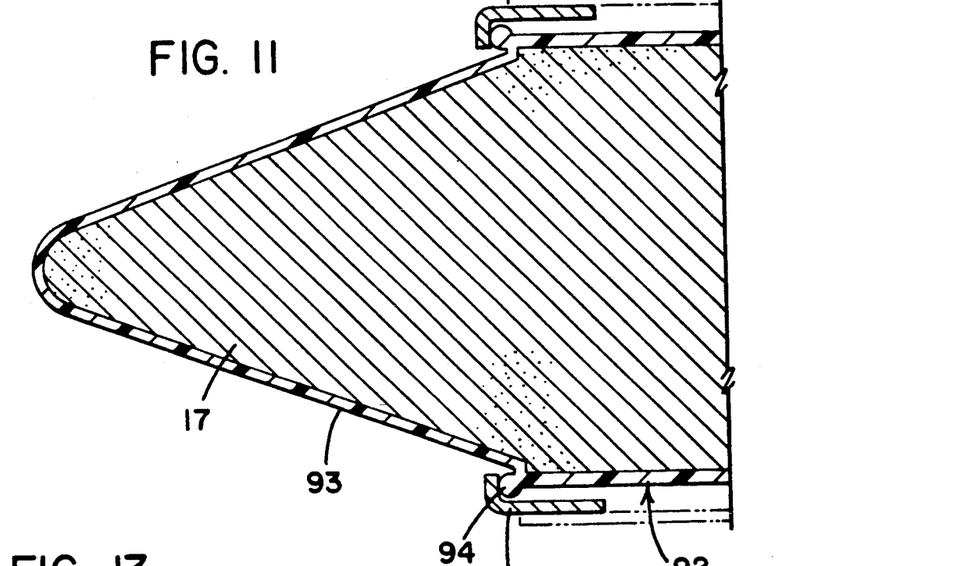
FIG. 11 is a side elevational view in cross section of an additional modification of the forward portion of a caulking cartridge and nozzle.

Another modification of the cartridge and nozzle combination is shown in FIG. 11, wherein the cartridge 92 has integral therewith a cone-shaped nozzle 93 of the same configuration as described above with respect to FIG. 9 wherein the nozzle's base is substantially the same diameter as that of the cartridge 92. In addition, the base of such nozzle 93 has an annular rib 94 which abuttingly engages a ring 95 (similar to ring 22 in FIG. 2) on the forward portion of a caulking gun.

Figures 12, 13:
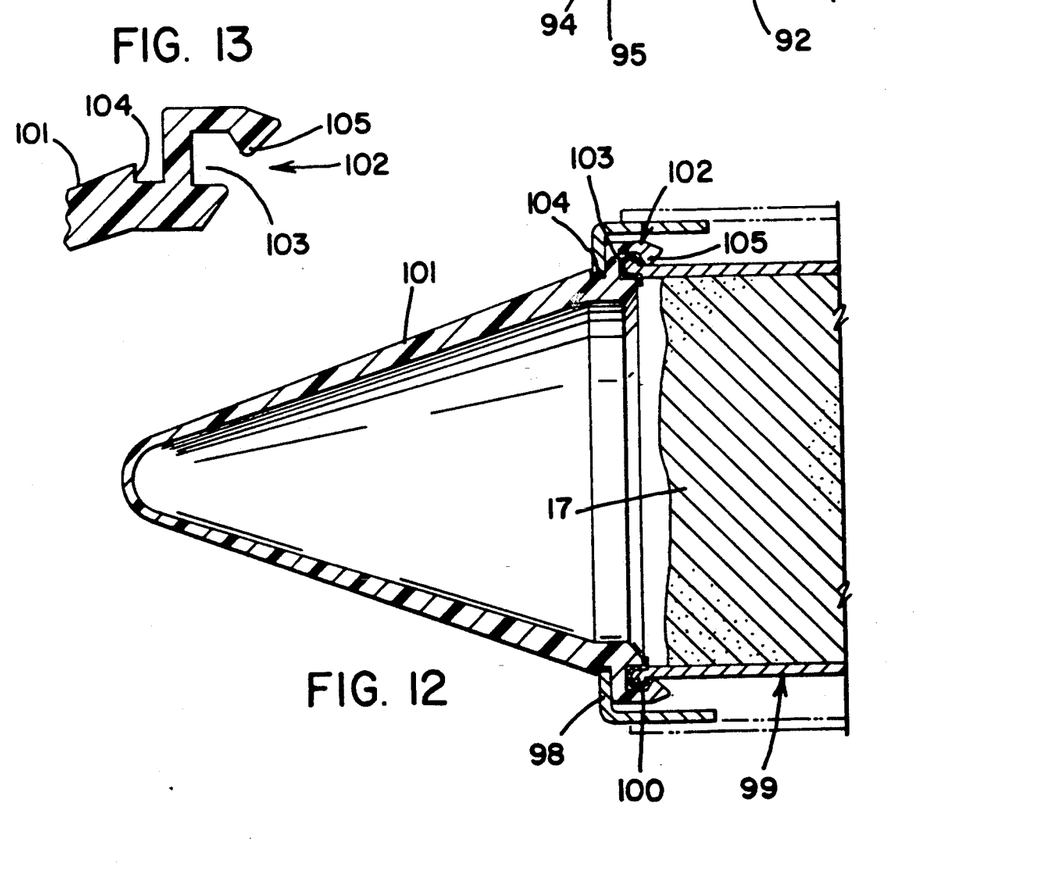
FIG. 12 is a side elevational view in cross section of an additional modification of the forward portion of a caulking cartridge and nozzle.
FIG. 13 is an enlarged fragmentary view of a portion of a nozzle shown in FIG. 12 in cross section.

Another modification of the invention is shown in FIG. 12 wherein the forwarding disposed ring 98 on the caulking gun is of the identical configuration as that shown in FIG. 1. The cartridge 99 is identical to that described above with respect to FIG. 9 wherein the cartridge has a forwardly disposed rim 100. A nozzle 101 with a sharp tapering cone has a flange 102 at the base thereof. Such flange 102 has a recess 103 on one side and an annular groove 104 on the reverse side, which groove 105 will snap into the caulking gun ring 98. The flange 102 adjacent to recess 103 has an annular lip 105 to sealingly engage the outer wall surface of cartridge 99. The nozzle 101 and cartridge 99 are considered integrally connected, however, after the first use of such integral cartridge 99 and nozzle 101 and the mastic has been completely emptied from the cartridge, such used cartridge can be removed from the nozzle 101 which is retained in its position on the ring 98 of the caulking gun.

Figures 14, 15, 16:
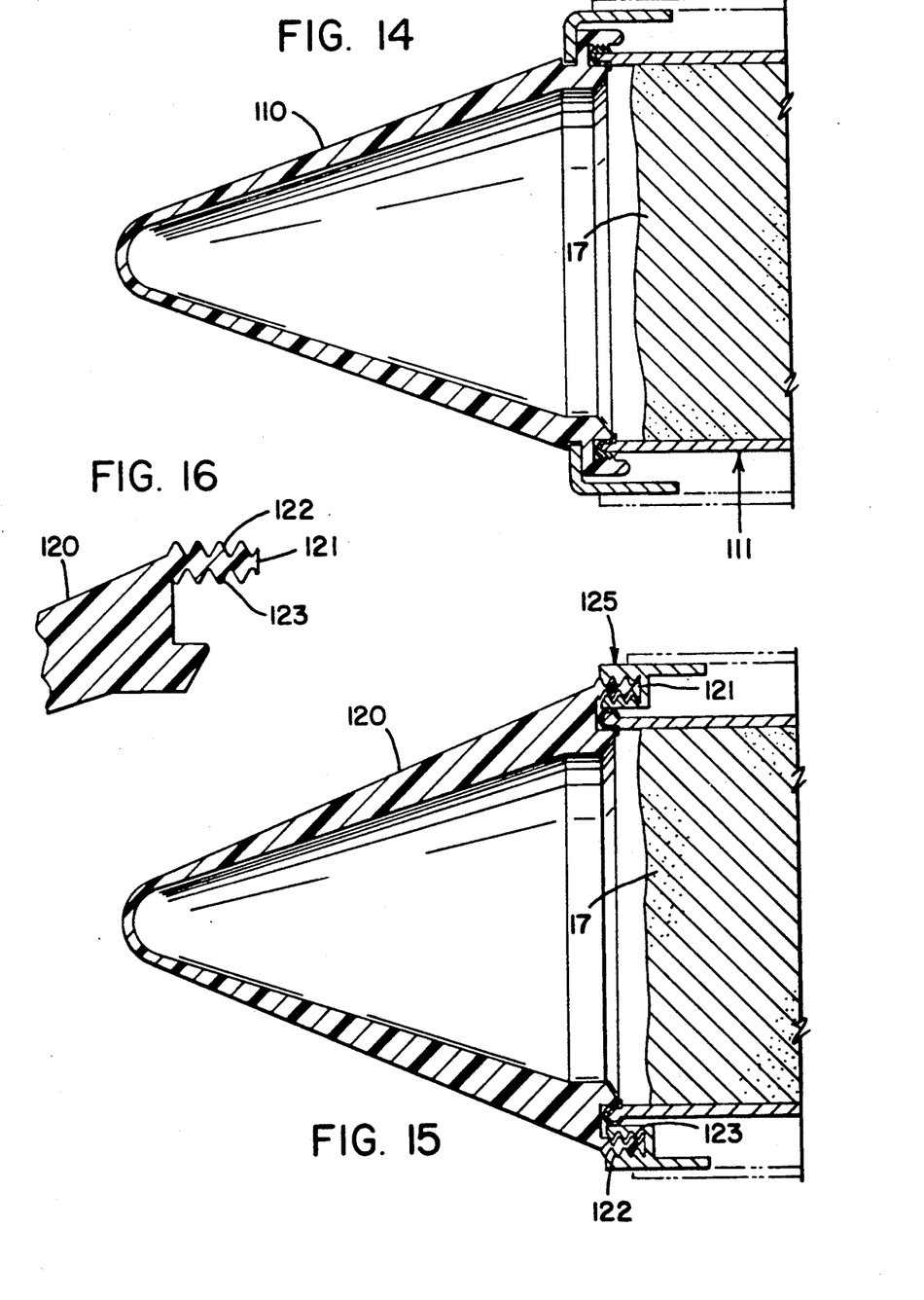
FIG. 14 is a side elevational view in cross section of a further modification of the forward portion of a caulking cartridge and nozzle.
FIG. 15 is a side elevational view in cross section of a further modification of the forward portion of a caulking cartridge and nozzle.
FIG. 16 is an enlarged fragmentary view of a portion of a nozzle shown in FIG. 15 in cross section.

A further modification of the invention is shown in FIG. 14 wherein the nozzle 110 and cartridge 111 are identical to that described above with respect to FIG. 12 except that the interconnection between nozzle 110 and cartridge 111, wherein the recess on the flange has a female threaded connection to mate with the male threaded connection on the forward rim portion of the cartridge.

A further modification of the invention is shown in FIG. 15 wherein the nozzle 120 has a base flange 121 with external threads 122 and internal threads 123 which are received by complimentary threads in a recess in a forwardly disposed ring portion 125 of a caulking gun (which ring portion 125 is the equivalent in location on the caulking gun as cup-shaped ring 22 in FIG. 1).

It will be apparent that, although a specific embodiment and certain modifications of the invention have been described in detail, the invention is not limited to the specifically illustrated and described constructions since variations may be made without departing from the principles of the invention.

What is claimed is:

1. A caulking gun comprising a supporting open framework with a rim member on one end and a trigger actuating mechanism on the other end, a longitudinally extending rod with teeth therein, a piston mounted on one end of said rod, said rod operatively connected to said trigger mechanism for selective advancement thereof toward said rim member, said rim member having an inner peripheral lip, a nozzle having an apex and a rearwardly disposed ring member, said ring member having means for removably connecting said ring member to said lip of said rim member, and said means on said ring member for connecting said ring to said lip includes a plurality of circumferentially spaced grooves to cooperate with said lip to lock said nozzle to said gun.

2. A caulking gun as set forth in claim 1 wherein said nozzle has a continuous cone-shaped configuration.

3. A caulking gun as set forth in claim 2 wherein said cone-shaped nozzle has a plurality of circumferentially spaced cams, said cam extend in a direction from said apex to said ring member to facilitate said rim member locking into said nozzle.

4. A caulking gun comprising a supporting open framework with a rim member on one end and a trigger actuating mechanism on the other end, a longitudinally extending rod with teeth thereon mounted on the other end of said supporting framework, a piston mounted on one end of said rod, said rod operatively connected to said trigger mechanism for selective advancement thereof toward said rim member, said rim member having a radially inwardly extending lip, a nozzle having an apex and a rearwardly disposed ring member, said ring member having groove means for removably connecting said nozzle to said lip on said rim member of said caulking gun, said ring member of said nozzle having an annular groove spaced from said groove means, said supporting open framework receives and supports a removable cartridge, said cartridge having a pair of spaced ends, one end of said cartridge having an edge that is sealingly received by said annular groove of said ring member to facilitate the selective removal therefrom, and said other end of said cartridge having a movable member that is engageable by said piston of said gun for dispensing mastic material from said cartridge through said nozzle.

5. A caulking gun as set forth in claim 4 wherein said nozzle has a plurality of longitudinally extending caming strips that cam said nozzle into locking engagement and connection of said ring member to said lip of said rim member on said gun.

6. A disposable caulking cartridge for use in a portable caulking gun comprising an elongated cylindrical tube with a forwardly disposed end portion and a rearwardly disposed end portion, a movable member mounted on said rearwardly disposed end portion for longitudinal movement within said cylindrical tube to apply pressure to mastic material within said cylindrical tube, a removable discharge nozzle selectively and detachably mounted on said forwardly disposed end portion of said cartridge, said nozzle having an annular ring portion and a conical portion, said ring portion having a diameter substantially equal to the diameter of said cylindrical tube, said conical portion begins at said ring portion and tapers along its full length to define an apex at its terminal end for the discharge of contents from said tube for application directly to the end use thereof, and said conical shaped nozzle adjacent to said cartridge has a plurality of circumferentially spaced cams on the surface thereof to facilitate the mounting of said cartridge into a caulking gun.

* * * * *